US006915350B2

(12) United States Patent
Malkosh

(10) Patent No.: US 6,915,350 B2
(45) Date of Patent: Jul. 5, 2005

(54) METHOD AND DEVICE FOR SELECTING A COMMUNICATION PATH

(75) Inventor: Menachem Malkosh, Rehovot (IL)

(73) Assignee: ECI Telecom Ltd., Petach Tikva (IL)

( * ) Notice: Subject to any disclaimer, the term of this patent is extended or adjusted under 35 U.S.C. 154(b) by 716 days.

(21) Appl. No.: 10/067,343

(22) Filed: Feb. 7, 2002

(65) Prior Publication Data

US 2003/0131130 A1 Jul. 10, 2003

(30) Foreign Application Priority Data

Jan. 8, 2002 (IL) .................................. 147518

(51) Int. Cl.[7] ...................... G06F 15/173; G06F 11/00; G05B 11/01
(52) U.S. Cl. ........................... 709/239; 370/228; 714/4
(58) Field of Search ................ 709/239; 370/228; 714/4

(56) References Cited

U.S. PATENT DOCUMENTS 6,848,062 B1 * 1/2005 Desai et al. .................. 714/4

2003/0063613 A1 * 4/2003 Carpini et al. .............. 370/401

OTHER PUBLICATIONS

Angela Chiu et al.; "Impairments and Other Constraints on Optical Layer Routing"; May 2001; http://search.ietf.org/internet–drafts/draft–ietf–ipo–impairments–02.txt.

* cited by examiner

Primary Examiner—William A. Cuchlinski, Jr.
Assistant Examiner—Michael Delgado
(74) Attorney, Agent, or Firm—Nath & Associates PLLC; Harold L. Novick

(57) ABSTRACT

A method of allocating a protection path in a communication network according to a maximum risk level allowed for affecting both main and protection paths by a single damaging event, is disclosed. The method is directed to ensure that for a required level of protection, derived from a maximum risk level allowed, no segments in the protection path, when taken together with any segment of the main path, presents a risk higher than the maximum risk level allowed.

8 Claims, 2 Drawing Sheets

METHOD AND DEVICE FOR SELECTING A COMMUNICATION PATH

FIELD OF THE INVENTION

The present invention relates generally to a method and device for the provision of adequately protected trails in optical communication networks.

BACKGROUND OF THE INVENTION

In an optical communication network a main path is used for transmitting communications between two or more nodes. A typical such network also uses a protection path for use in a case where communication cannot be transmitted along the main path, e.g. a cut in the optical fiber, etc. There are many risk factors that may render such a main path inoperative, such as an earthquake, an explosion, and careless human operations such as cutting a fiber during digging in the vicinity of the fiber. Therefore, careful selection of a pair of main and protection paths is required, in order to minimize the risk that both paths become inoperative as a consequence of a single damaging effect. This pair of paths, main and protection, is known as a protected trail.

In order to provide a tool for enabling a network operator to select a suitable pair of such main and backup paths that provides acceptable diversity, a concept of grouping segments of the network into Shared Risk Link Groups (SRLGs) has been suggested in order to allow the selection of main and protection paths by not allowing any SRLG to be common to both paths. This concept is described in an excerpt from an Internet Engineering Task Force (IETF) draft document, work in progress, draft-ietf-ipo-impairments-00.txt, by Chiu et al, May 2001, the disclosure of which is hereby incorporated herein by reference.

However, when trying to implement the concept described in this reference, in order to obtain a diversified pair of main and protection paths that conform with the reliability requirements of the operator, the operator must input many parameters such that only when taken together guarantee the required relationship between any such two selected paths. For example, in order to avoid disruptions in the optical communication network at a certain degree of confidence, the network operator may want to avoid the main and protection paths to have any number of the following: a common duct; a common conduit; and common central office (CO) equipment. Bearing in mind that many protected trails need to be provisioned, it is understandable that this task imposed on the operator is a rather complicated task. Therefore, simpler mechanisms that will allow the selection of suitable pairs of main and protection paths are desired.

SUMMARY OF THE INVENTION

The present invention provides an improved method of selecting a protection path in optical communication networks that provides a required diversity from a given main path.

Further objects and features of the invention will become apparent to those skilled in the art from the following description and the accompanying drawings.

There is thus provided in accordance with a preferred embodiment of the present invention, a method of allocating a second path of communication for use as a protection path for a first communication path, wherein the allocation is made in accordance with a chosen risk level definition, which method comprises:

(i) providing data corresponding to physical and geographical deployment of a plurality of communication segments belonging to the communication network;

(ii) selecting N number of risk levels based on predefined criteria;

(iii) for each of the N number of risk levels, assigning the plurality of communication segments to a plurality of Shared Risk Groups (to be referred to hereinafter as "SRGs") so that all communication segments belonging to any specific SRG are at risk of being damaged by a single damage event, where the probability of occurrence of such an event is represented by the risk level assigned to the specific SRG;

(iv) choosing a first path of communication comprising a first group of communication segments selected from among the plurality of communication segments belonging to the communication network;

(v) defining a risk level R which represents the highest risk level to be prevented; and (vi) selecting a second group of communication segments from among the plurality of communication segments belonging to the communication network to establish the second communication path, wherein the second group of communication segments satisfies the following conditions:

one of the selected segments of the second group starts at the starting point of the first path of communication;

one of the selected segments of the second group ends at the end point of the first path of communication;

all communication segments belonging to the second group constitute one continuous path starting at the starting point of the first path and ending at the end point of the first path; and there is no SRG to which the risk level R or lower was assigned, that contains both a communication segment belonging to the first communication path and a communication segment belonging to the second communication path.

The assignment of the segments to a number of groups, called Shared Risk Groups (SRG), is based on predefined criteria. Membership in a SRG is based on the principle that two segments belong to the same SRG, which has a certain risk level assigned to it, if there exists certain likelihood that a single damage event, of particular severity, will harm both segments. The risk level assigned to a SRG reflects the severity of the damage events whose resulting harm the particular SRG comes to avoid.

According to another preferred embodiment of the present invention, the method provided further comprises:

(vii) determining whether a second communication path, for which the selection conditions defined hold with respect to said first communication path, is found;

(viii) if not found, selecting a different first communication path, having the same starting point and ending point as the original first communication path;

(ix) repeating the step of selecting a second group of communication segments with respect to the different first communication path;

(x) determining whether a second communication path, for which the selection conditions defined hold with respect to the different first communication path, is found; and (xi) repeating steps (vii) to (x) mutatis mutandis, if the outcome of step (x) is negative.

According to another aspect of the present invention, there is provided a device for allocating a second path of communication for use as a protection path for a first communication path, wherein the allocation is made in accordance with a chosen risk level definition, the device comprising:

a database comprising data corresponding to physical and geographical deployment of a plurality of communication segments belonging to a communication network, wherein the communication segments are assigned to a plurality of SRGs for each of N number of risk levels, so that all communication segments belonging to any specific SRG are at risk of being damaged by a single damage event, where the probability of occurrence of such an event is represented by the risk level assigned to the specific SRG;

an input/output (I/O) unit operative to receive a required input risk level; and a processor operatively associated with the database and the I/O unit and operative to select a second group of communication segments from among the plurality of communication segments to establish the second communication path, wherein the second group of communication segments satisfies the following conditions:

one of the selected segments of the second group starts at the starting point of the first path of communication;

one of the selected segments of the second group ends at the end point of the first path of communication;

all communication segments belonging to the second group comprise one continuous path starting at the starting point of the first path and ending at the end point of the first path; and there is no SRG to which the risk level R or lower was assigned, that contains both a communication segment belonging to the first communication path and a communication segment belonging to the second communication path.

Preferably, the device provided is adapted to operate in a network in which diverse routing of protection paths in needed, such as an optical communication network.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
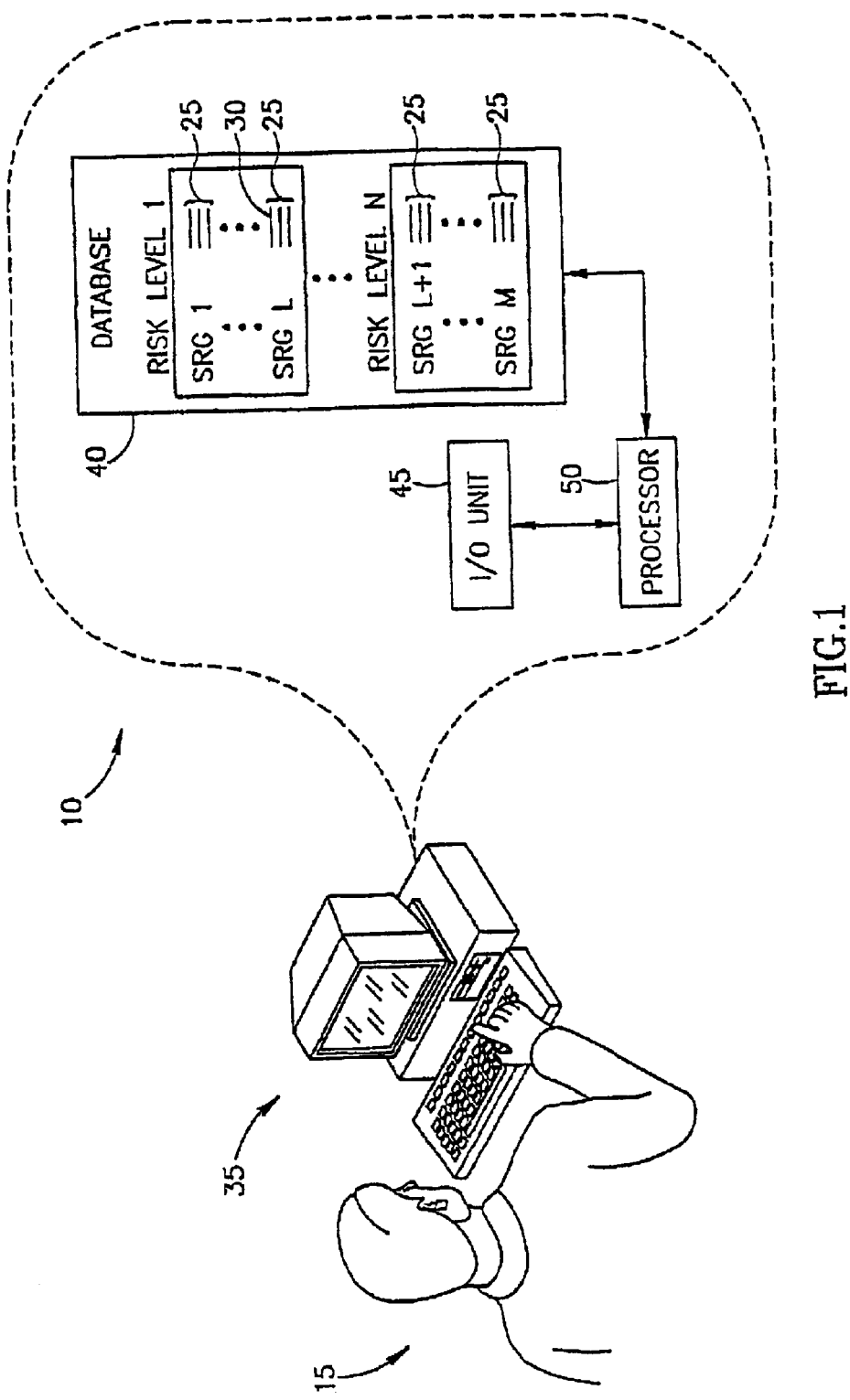
FIG. 1 is a simplified partly pictorial partly block diagram illustration of a protection path selecting device constructed and operative in accordance with a preferred embodiment of the present invention.

Reference is now made to FIG. 1, which is a simplified partly pictorial partly block diagram illustration of a selecting device 10 constructed and operative in accordance with a preferred embodiment of the present invention.

Preferably, the device 10 enables a network operator 15 to select a path, in a network in which diverse routing of protection paths in needed, e.g. a communication network (not shown), that can be used as a protection path to a main path 30 extending between a first network element $Ne_f$ and a last network element $Ne_l$ (not shown). The selection of the segments, sometimes also called the communication path segments, constituting this protection path is made from among a plurality of candidate segments 25, and is based on fulfilling several conditions in order that the protection path thus obtained may qualify as a protection path being in conformity with the risk level specified by the operator. Such communication network may include, for example, a synchronous network, such as a network based on at least one of the following: Synchronous Optical Network (SONET), Synchronous Digital Hierarchy (SDH); Plesiochronous Digital Hierarchy (PDH), or may be an Optical Transport Network (OTN), a datacom network such as an IP network, and the like, and any combinations thereof.

Device 10 may preferably be embodied in a computer 35 or any other adequate processing device, or operatively associated therewith. The device 10 preferably includes the following elements: a database 40; an input/output (I/O) unit 45; and a processor 50.

The database 40 preferably includes data corresponding to physical and geographical deployment of each of the segments in a plurality of communication segments that belong to the communication network. For example, the following information may be included in the database 40 for each of the segments referred therein: the segment's ends; a route passed by the segment; natural obstacles crossed by the segment such as a river; manmade obstacles crossed by the segment such as a railroad; crossing points with other segments; sheaths, ducts and conduits through which the segment passes; distance from other segments; distance from manmade objects that may affect the segment in case of a disaster; communication equipment shared with other segments; and so forth. The segments are then divided into a number of groups, called Shared Risk Groups (SRG), based on predefined criteria. Membership in an SRG is based on the principle that two segments belong to the same SRG having a certain risk level assigned to it, if there exists certain likelihood that a single damage event, of particular severity, will harm both segments. The risk level assigned to a SRG reflects the severity of the damage events whose resulting harm the particular SRG comes to avoid. These risk levels are set for example in ascending order starting from 1, where for segments in the same SRG of level 1, the operator has the lowest level of confidence in the survivability of the path from a damage event. In other words, choosing a protection path according to risk level 1 guarantees it survivability against commonly occurring damage events. Specifying a higher risk level for choosing a protection path guarantees it survivability also against more severe damage events. The severity of damage events, whose harm is being avoided, increases as the specified risk level increases. For example, risk level 1 may refer to events such as a bulldozer cutting a group of cables, risk level 3 may refer to a bomb falling on an area where there are cables, and risk level 5 might refer to earthquakes. Note that a segment may belong to many SRGs, some with the same risk level and some with different risk levels.

The data may include, among other characteristics, features characterizing the segments such as: a sheath; a duct; a conduit; a reinforced conduit; a right-of-way (ROW); communication equipment; a crossing duct point of presence (POP); and a power generator. Accordingly, the SRGs are determined so as to avoid one or more single points of failure (SPoFs). The following Table A includes a non-limiting example of possible risk levels and the potential SPoFs to avoid at each risk level:

TABLE A

| RISK LEVEL | EXAMPLES OF POTENTIAL SPoFs |
| --- | --- |
| 1* | Ducts |
| 2* | 1* + Communication Equipment |
| 3* | 2* + Crossing ducts up to a depth of 0.5 meters |
| 4* | 3* + Reinforced ducts + ducts up to a depth of 2.0 meters + ducts separated by up to 50 meters |
| 5* | 4* + ducts separated by up to 2000 meters |
| 6* | 5* + ducts separated by up to 10000 meters |

To continue the example, consider four ducts, A, B, C, and D, which lie in the ground, in parallel one to the other, with 20 meters separating A and B, 20 meters separating B and C, and 40 meters separating C and D. There will be one SRG, with risk level 4, in which A and B and C are members. Another SRG, with risk level 4, will contain C and D as members. A third SRG, with risk level 5, will have all four ducts as members.

For each of the risk levels, the communication segments included in database 40 are assigned to a plurality of SRGs by an operator, using processor 50 which is operatively associated with database 40 and the I/O unit 45, in such a way that all communication segments belonging to any specific SRG are at risk of being damaged by a single damage event. Again, as previously explained, the probability of occurrence of such an event is actually represented by the risk level assigned to the specific SRG.

According to this example, the operator is first given a starting point and an end point for the required path. Network operator 15 inputs this information via I/O unit 45 to processor 50, and a main path comprising a plurality of segments chosen from database 40, is derived. In the next stage, the operator inputs via I/O unit 45 to processor 50 the allowed risk level, which corresponds to the requirements and constraints for choosing the protection path. Let us take for example the case where a risk level 5 is required, e.g. a level where all segments belonging to the protection path must be physically separated from the segments belonging to the main path by at least 2 km to avoid all damage events that might have an impact on any optical fiber within 2 km, irrespective of the damage event itself.

Next, processor 50 starts with a selection process of a second group of communication segments from among the communication segments in database 40, in order to allocate the protection path. In order to successfully complete the selection process the following conditions must be satisfied:

1. one of the selected segments out of the second group of segments must start at the starting point of the first path of communication (the main path);
2. one of the selected segments out of the second group of segments must end at the end point of the main path;
3. all communication segments belonging to the second group can be arranged so that they comprise one continuous path starting at the starting point of the first path and ending at the end point of the first path;
4. there is no SRG in database 40 to which the risk level selected (5 in our case) or lower was assigned, that contains both a communication segment belonging to the first communication path (main path) and a communication segment belonging to the second communication path (protection path).

Taking the example shown in Table A, when our network operator 15 selects risk level=5, the list of segments outputted by processor 50 will include only segments that are separated by at least 2000 meters from all the segments of the main path.

In accordance with another preferred embodiment of the present invention, the risk levels assigned are based on single point of failure risk probabilities obtained from weighted averaging of probabilities of occurrence of potential risk types. In such a case, each risk level preferably corresponds to a probability value (or rather to a range of probability values), which in turn corresponds to the probability that a number of damaging events will occur simultaneously or within a relative short period of time.

Figure 2:
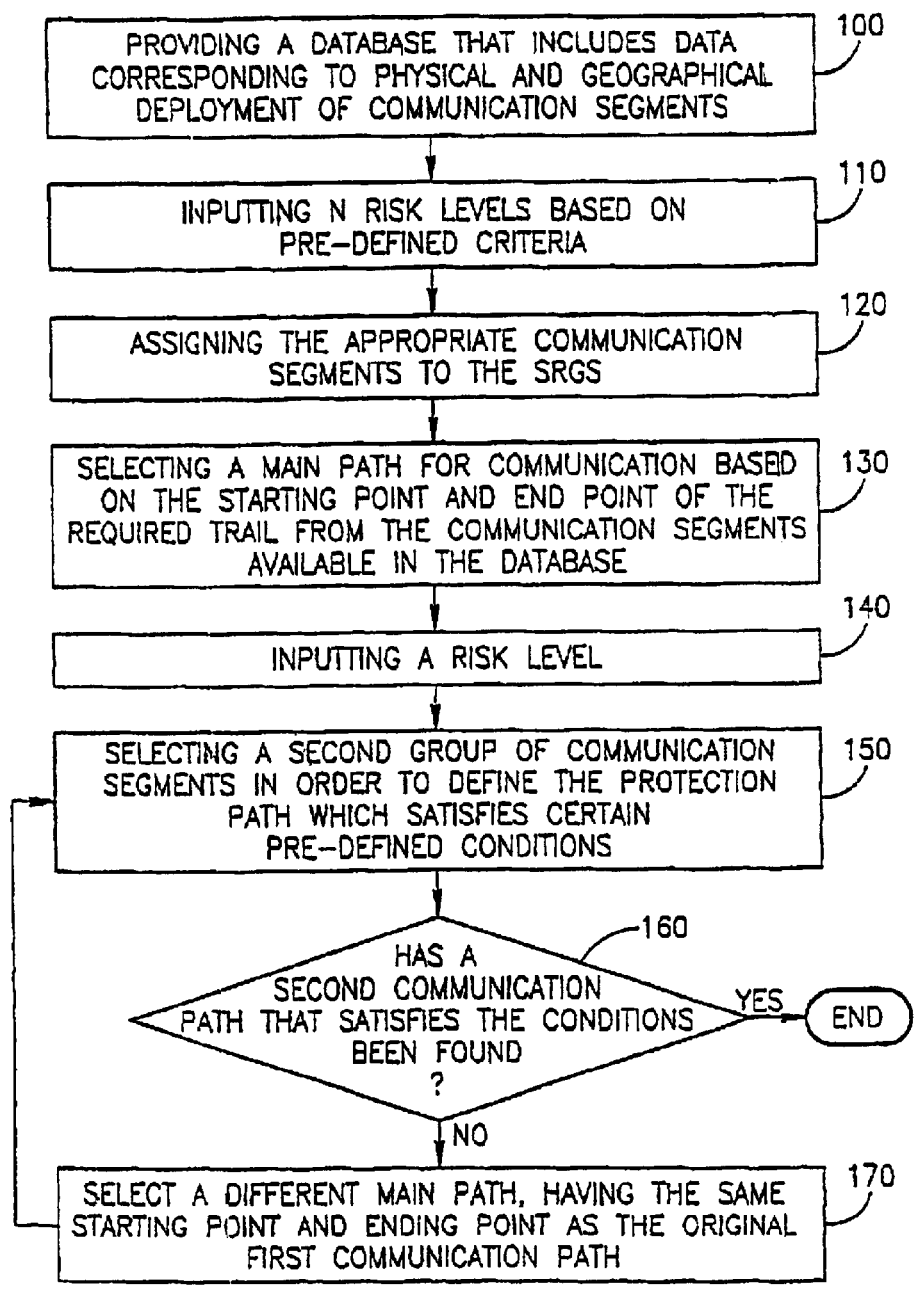
FIG. 2 is a simplified flowchart illustration of a preferred method of operation of the device of FIG. 1.

Reference is now made to FIG. 2, which is a simplified flowchart illustration of a preferred method of operation of the device of FIG. 1.

A database that includes data corresponding to physical and geographical deployment of a plurality of communication segments is provided (step 100).

A number N of risk levels based on predefined criteria is then selected (step 110). For each of the N number of risk levels, the communication segments included in the database are assigned (step 120) to a plurality of SRGs so that all communication segments belonging to any specific SRG are at risk of being damaged by a single damage event, where the probability of occurrence of such an event is represented by the risk level assigned to the specific SRG.

The above described steps are preferably steps followed only when the network is built, and that are not normally repeated, unless for example when the network is expanded to include further segments or equipment.

In Step 130, the main path for communication is selected based on the starting point and end point of the required trail, according to routing criteria which are not relevant to the present invention. This main path comprises a first group of communication segments selected from among the communication segments belonging to the communication network in the database.

In the next step, the operator defines a risk level R which represents the highest risk level to be prevented (step 140). As would be understood by those skilled in the art, this step may be eliminated while operating the network under a fixed risk level.

In step 150, a second group of communication segments is selected from among those included in the database (excluding those already chosen for the main path) in order to allocate the protection path. This selection is made so that the chosen second group of segments satisfies the following conditions:

one of the selected segments starts at the starting point of the main path;

one of the selected segments ends at the end point of the main path;

all communication segments belonging to the second group comprise one continuous path starting at the starting point of the main path and ending at the end point of the main path;

there is no SRG to which the risk level R or lower was assigned, that contains both a communication segment belonging to the main path and a communication segment belonging to the protection path.

If no second communication path can be found to satisfy these conditions (step 160), an iterative procedure is initiated by re-selecting a different main path, having the same starting point and ending point as the original first communication path and step 150 is repeated).

It will be appreciated that the above described methods may be varied in many ways, including changing the order of steps, and the exact implementation used. It should also be appreciated that the above described description of methods and device are to be interpreted as including device for carrying out the methods and methods of using the device.

The present invention has been described using non-limiting detailed descriptions of embodiments thereof that are provided by way of example and are not intended to limit the scope of the invention. It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art.

It is noted that some of the above described embodiments describe the best mode contemplated by the inventor and therefore include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims. When used in the following claims, the terms "comprise", "include", "have" and their conjugates mean "including but not limited to".

What is claimed is:

1. In a communication network, a method of allocating a second path of communication for use as a protection path for a first communication path, wherein the allocation is made in accordance with a chosen risk level definition, which method comprises:

(i) providing data corresponding to physical and geographical deployment of a plurality of communication path segments belonging to the communication network;

(ii) selecting N number of risk levels based on predefined criteria;

(iii) for each of said N number of risk levels, assigning said plurality of communication path segments to a plurality of SRGs, where an SRG is a Shared Risk Group of communication path segments selected by predefined criteria so that all communication path segments belonging to any specific SRG are at risk of being damaged by a single damage event, where the probability of occurrence of such an event is represented by the risk level assigned to the specific SRG;

(iv) choosing a first path of communication comprising a first group of communication path segments selected from among said plurality of communication path segments belonging to the communication network;

(v) defining a risk level R which represents the highest risk level to be prevented; and (vi) selecting a second group of communication path segments from among said plurality of communication path segments belonging to said communication network to establish said second communication path, wherein said second group of communication path segments satisfies the following conditions:
one of the selected segments of said second group starts at the starting point of the first path of communication;
one of the selected segments of said second group ends at the end point of the first path of communication;
all communication path segments belonging to the second group comprise one continuous path starting at the starting point of the first path and ending at the end point of the first path; and
there is no SRG to which the risk level R or lower was assigned, that contains both a communication segment belonging to the first communication path and a communication segment belonging to the second communication path.

2. A method according to claim 1, further comprising:

(vii) determining whether a second communication path, for which the selection conditions defined hold with respect to said first communication path, is found;

(viii) if not found, selecting a different first communication path, having the same starting point and ending point as the original first communication path;

(ix) repeating the step of selecting a second group of communication path segments with respect to said different first communication path;

(x) determining whether a second communication path, for which the selection conditions defined hold with respect to said different first communication path, is found; and (xi) repeating steps (vii) to (x) mutatis mutandis, if the outcome of step (x) is negative.

3. The method according to claim 1, wherein said data comprises characterization of the communication path segments according to physical characteristics or location, such as: a sheath; a duct; a conduit; a reinforced conduit; a right-of-way (ROW); communication equipment; a crossing duct point of presence (POP); and a power generator.

4. The method according to claim 1, wherein said communication network is a member of a group comprising: an optical communication network, a datacom network, a synchronous network, and any combination thereof.

5. The method according to claim 1, wherein said communication network comprises an optical telecommunication network.

6. A device for allocating a second path of communication for use as a protection path for a first communication path, wherein the allocation is made in accordance with a chosen risk level definition, the device comprising:

a database comprising data corresponding to physical and geographical deployment of a plurality of communication path segments belonging to a communication network, wherein said communication path segments are assigned to a plurality of SRGs for each of N number of risk levels, so that all communication path segments belonging to any specific SRG are at risk of being damaged by a single damage event, where the probability of occurrence of such an event is represented by the risk level assigned to the specific SRG;

an input/output (I/O) unit operative to receive a required input risk level; and a processor operatively associated with the database and the I/O unit and operative to select a second group of communication path segments from among said plurality of communication path segments to establish said second communication path, wherein said second group of communication path segments satisfies the following conditions:
one of the selected segments of said second group starts at the starting point of the first path of communication;
one of the selected segments of said second group ends at the end point of the first path of communication;
all communication path segments belonging to the second group comprise one continuous path starting at the starting point of the first path and ending at the end point of the first path; and
there is no SRG to which the risk level R or lower was assigned, that contains both a communication segment belonging to the first communication path and a communication segment belonging to the second communication path.

7. The device according to claim 6, adapted to operate in a network in which diverse routing of protection paths is needed.

8. The device according to claim 7, wherein said network is an optical communication network.

* * * * *